Patented Dec. 13, 1938

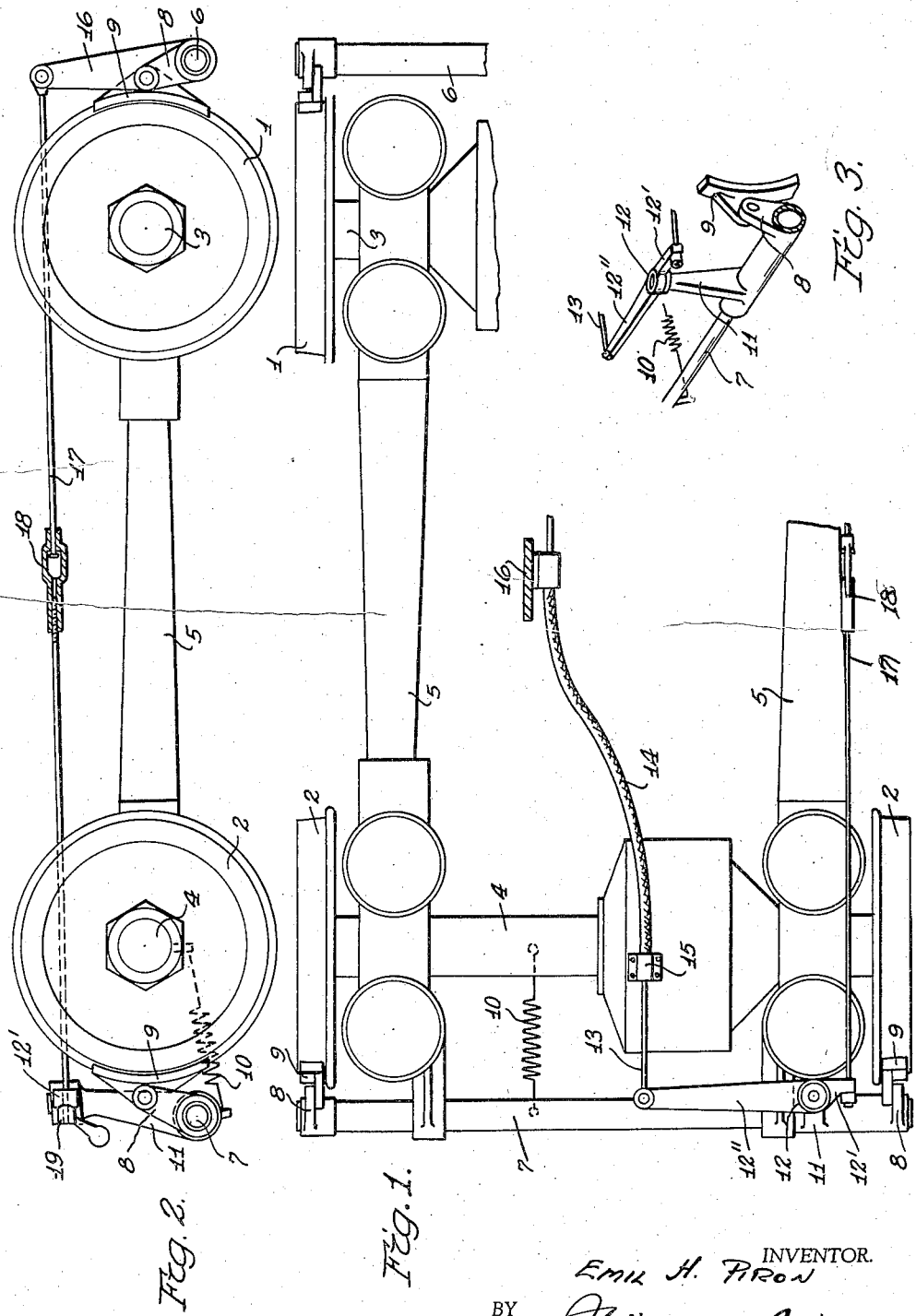

2,140,114

UNITED STATES PATENT OFFICE 2,140,114

HAND BRAKE LINKAGE

Emil H. Piron, New York, N. Y., assignor to Transit Research Corporation, New York, N. Y., a corporation of New York Application May 1, 1937, Serial No. 140,129

3 Claims. (Cl. 188—49)

This invention relates to brake gear or linkage primarily intended for hand or foot brake operation, although not necessarily limited thereto, and adapted to application to or incorporation in a wide field of vehicle structures. The brake operating means may be actuated from the vehicle under which the truck is mounted on, with equal facility, from a point remote from the truck, as for instance from a vehicle ahead of the truck to which the same is directly or indirectly coupled.

One of the objects of the invention is to obtain sensitivity of operation without the undesirable looseness, lost motion, chatter and noise commonly attendant in the use of conventional rail brakes.

A uniform distribution of pressures to the several brakes used is also contemplated as an important feature of the linkage, together with more efficiently applied leverage lending itself to cable operation, as from a remotely situated foot brake. A form of brake linkage having self-equalizing characteristics, resulting from the incorporation in said linkage of a floating pivoting support forming in itself a brake operating member, is another objective of the proposed arrangement.

A further object is to provide, in a brake operating linkage, a brake operating lever actuated by a member operating a further brake operating member, said first lever acting by its movement as a floating pivot to modify and to equalize the operative effect of said member on said second brake lever.

Other objects and advantages will become hereinafter more fully apparent from the description and illustrations of the example of an application of my invention shown in the accompanying drawing, wherein:

Figure 1 is a broken plan view of a truck structure having an embodiment of the improved brake linkage applied thereto;

Figure 2 is a side elevation of the same;

Figure 3 is a detail perspective view of the distributing linkage of the mechanism.

Detailed description of the truck is not entered into or illustrated herein as the brake linkage arrangement may be applied to a wide variety of constructions which may not even fall within the general category of trucks, inasmuch as ordinary mechanical expediency may be availed of to adapt the mechanism or linkage to the braking of the wheels of almost any type of rolling stock or wheeled vehicle.

In this example the truck is simply shown as having pairs of front and rear wheels 1 and 2, respectively mounted on axles 3 and 4, journaled in the side members 5 of the truck frame, the front and rear cross members 6 and 7 of which frame are shown as being in the form of brake shafts rotatable in the ends of the said side members. The construction of the said side members, and such other cross bracing as may be desirable is not material to this disclosure and is therefore not dwelt upon.

Fixedly mounted on the ends of the shafts 6 and 7 are brake arms 8 carrying shoes 9, which shoes may, if desired, be rockably mounted on said arms in any suitable or usual manner, these shoes being held in normally spaced relation to the tread surface of their respective wheels by the action of brake-retracting springs 10 or equivalent means.

The brake shaft 7 is shown as having also fixedly mounted thereon a brake-applying element in the form of an upstanding arm 11, hereinafter referred to as a "floating pivot", the upper end of which forms the fulcrum on which a horizontal transverse lever 12 is mounted, the fulcrum point of said lever being materially near one end thereof whereby the lever is characterized by a short arm 12' and the long arm 12''. For convenience, the floating pivot 11 is preferably near one end of the shaft 7, somewhat adjacent one of the brake arms 8, with the short arm of the lever 12 extending in the direction of the said brake arm and the long arm of the said lever extending toward or across the center of the truck frame.

To the end of the said longer arm is attached a power-applying means, such as a cable 13, which may in turn be connected to a foot pedal or any other desired operating means (not shown), 14 illustrating the cable sheath supported at 15 and 16 on any suitable parts of the truck and vehicle body respectively, but in such manner, of course, that motions of the vehicle or truck elements relative to the wheels will not impose stresses on the cable tending to impart undesired motion to the lever 12 as will be readily understood.

The other brake shaft 6 is also provided with a fixedly attached brake-applying element in the form of an upstanding arm 16, the upper end of which is coupled to the end of the short arm 12' of the lever 12 by a rod 17, interrupted by a turnbuckle 18 for purposes of lineal adjustment, and for further adjustment the opposite end of the said rod may be connected to the short arm of the said lever 12 by being passed there-through and equipped with a weighted adjusting nut 1. By these means, setting of brake clearances may be effected.

It will be apparent that with the brake-retracting springs properly related as to resistance to closing action of the rear and of the front brakes, and by a suitable proportioning of the relative lengths of the cooperating lever arms, a forward pull of the cable 13 will result in a forward swing of the arm 12″ of the lever 12 about its fulcrum, a rearward swing of the shorter arm about said fulcrum, and a forward swing of the floating pivot to an extent whereby forward movement of the fulcrum point of the lever 12 is exceeded in extent by the rearward movement of that point of the short arm 12′ of the said lever to which the end of coupling rod 17 is attached. Thus a rearward motion is effected in the said coupling rod with the consequent rearward swinging of the arm 16 on the brake shaft 6 and the consequent closing motion of the forward brake shoes 9 simultaneously with the closing motion of the rear brake shoes.

If the arms 11 and 16 be of the same length, the proportioning of resistance to their swinging and the relative proportioning of the long and short arms of the lever 12 are intended to be such, as can be readily arrived at by calculation, that the forward swing of the floating pivot 11 will be equal to the rearward swing imposed on the arm 16 by the pivoted action of the said lever. It is pointed out, however, that the proportions referred to are of a general nature, and not of a meticulous nature, as the linkage described is of a characteristically equalizing nature.

While the lever 12 is described and claimed as being transversely mounted on the floating pivot 11, this being the most logical arrangement for most purposes, it will be self-evident that this need not necessarily be the actual relative arrangement of these parts as it would be mechanically equivalent, for instance, to pivot the said lever 12 for vertical instead of horizontal swinging on the floating pivot with equal effect as to operation if not convenience. Therefore the term "transverse lever" as used herein and in the claims is intended to be interpreted in its broadest sense as to angular variation from that actually shown in the example. Also the term "truck" as used herein and in the claims is intended to include any wheeled structure to which the improved brake linkage is applicable.

While the description contemplates the operation of the truck from left to right of the drawing, obviously it may be operated in reverse direction without altering my invention.

What is claimed is:
1. In a brake system for a vehicle having two axles and wheels at the ends of said axles, a horizontally journalled shaft paralleling each of said axles and having a brake supporting arm arising from each end thereof, brake shoes carried by said arms, and equalizer means for simultaneously rotating said shafts in opposite directions to apply said shoes against said wheels comprising a vertical extension arising from one of said shafts and terminating in a bearing portion, a lever journalled intermediate its ends on said bearing portion for horizontal swinging movements, means connecting one end of said lever to an actuating element for the brake shoes remote therefrom, and means connecting the other end of said lever to an actuating means for the system.

2. In a brake system for a vehicle having two axles and wheels at the ends of said axles, a shaft parallelling each of said axles and journalled horizontally below the centers of said wheels and each having a brake supporting arm arising from each end thereof, brake shoes carried by said arms and having the center thereof at the approximate elevation of the centers of said wheels, and equalizer means for simultaneously rotating said shafts in opposite directions to apply said shoes against said wheels comprising a vertical extension arising from one of said shafts and terminating in a bearing portion, a lever journalled intermediate its ends on said bearing portion for horizontal swinging movements, means connecting one end of said lever to an actuating element for the brake shoes remote therefrom, and means connecting the other end of said lever to an actuating means for the system.

3. In a brake system for a vehicle having two axles and wheels at the ends of said axles, a horizontally journalled shaft paralleling each of said axles and having a brake supporting arm arising from each end thereof, brake shoes carried by said arms, and equalizer means for simultaneously rotating said shafts in opposite directions to apply said shoes against said wheels comprising a vertical extension arising from each of said shafts, one of said extensions terminating in a vertical cylindrical bearing portion, the other of said extensions having a pull rod pivotally attached thereto, a lever journalled intermediate its ends on said bearing portion for horizontal swinging movements, means connecting one end of said lever to said pull rod, and means connecting the other end of said lever to an actuating means for the system.

EMIL H. PIRON.